United States Patent Office 3,279,316
Patented Oct. 18, 1966

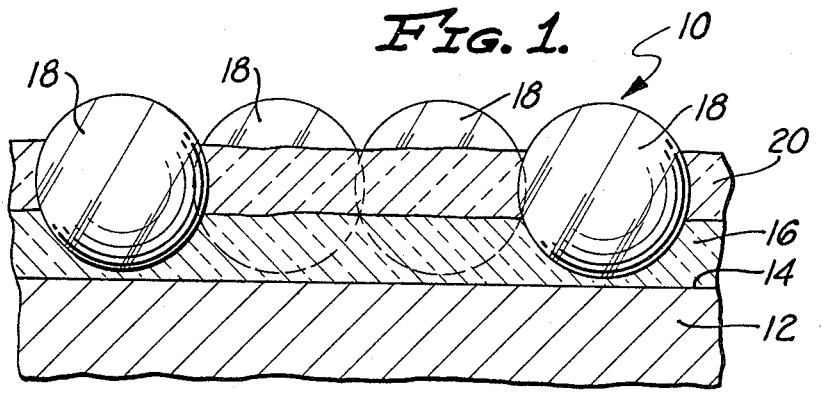
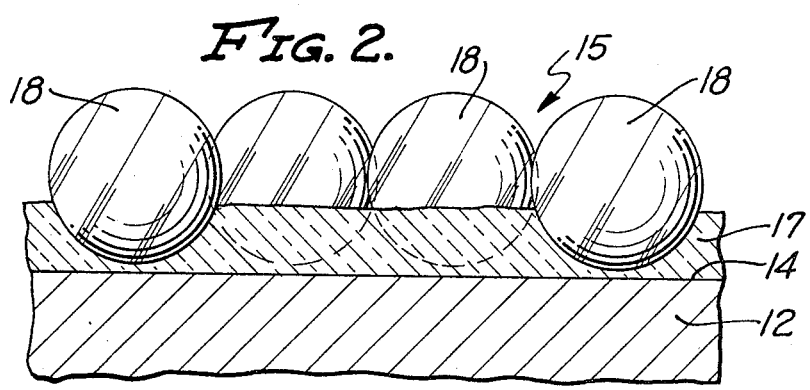
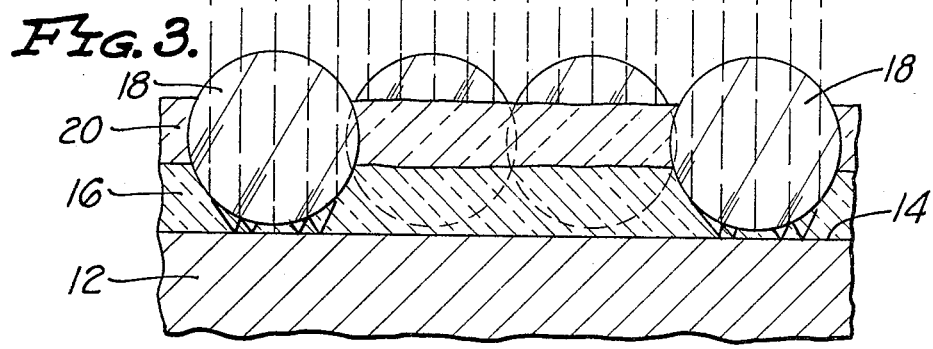
INVENTORS
HUGH V. PENTON,
PAUL G. KATES
BY Thomas P. Mahoney
ATTORNEY Oct. 18, 1966   H. V. PENTON ETAL   3,279,316
REFLEX REFLECTING ARTICLE FOR USE AS A SIGN OR THE LIKE
Filed March 26, 1962   2 Sheets-Sheet 2
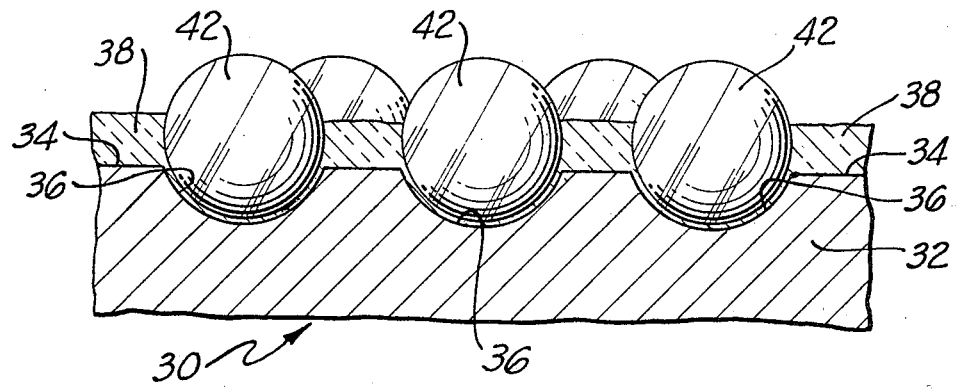
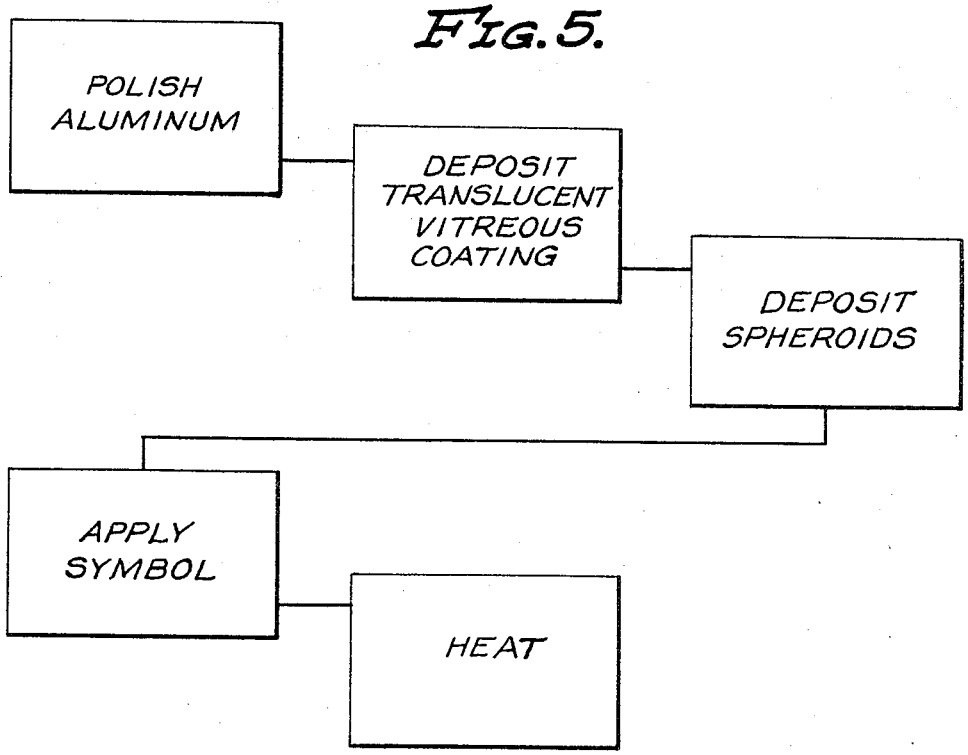
INVENTORS
HUGH V. PENTON,
PAUL G. KATES
BY Thomas P. Mahoney
ATTORNEY

3,279,316
REFLEX REFLECTING ARTICLE FOR USE AS A SIGN OR THE LIKE
Hugh V. Penton, San Marino, and Paul G. Kates, Fullerton, Calif., assignors to California Metal Enameling Company, Los Angeles, Calif., a corporation of California
Filed Mar. 26, 1962, Ser. No. 182,238
3 Claims. (Cl. 88—82)

This invention relates to a light reflecting article and to a method of manfacturing the same.

The teachings of the invention have particular application in the fabrication of various types of light reflecting signs, but it will be obvious to those skilled in the art that said teachings may be applied with equal cogency to other devices and it is, therefore, not intended to limit the teachings to any particular mode of utilization thereof.

As is well known to those skilled in the art, various attempts have been made to provide light reflecting articles, such as road markers, street signs, and the like, which are adapted to reflect a maximum amount of light so that they may be readily viewed at night. However, considerable difficulty has been encountered in manufacturing light reflecting articles which would stand up under the rigors of climatic exposure and which would still provide maximum light reflectivity.

Typical prior art expedients have included light reflecting articles incorporating spheroidal, light refracting bodies, such as glass spheroids having dimensions in the order of .025 to .035 of an inch, with said glass spheroids mounted adhesively upon a reflecting surface secured to a supporting member. Unfortunately, such prior art expedients have been inherently incapable of performing adequately for long periods of time and, when exposed to extreme climatic conditions, are subject to premature deterioration and failure.

A most desirable type of material for utilization in outdoor signs is found among the vitreous enamels which can be applied to a sheet metal surface adapted to act as a support for said vitreous enamels and which have an impervious, glass-like weather-resistant finish. However, conventional vitreous enamel signs have been characterized by minimal light reflectivity due to the relative opacity of the vitreous enamels themselves and due to the fact that spheroidal bodies utilized in conjunction therewith cannot reflect and refract light impinging thereupon with maximum efficiency due to the oxidized condition of the sheet metal surface over which they are superposed.

It is, therefore, an object of the invention to provide a light reflecting article which is characterized by the utilization of vitreous enamels in conjunction with light transmitting spheroidal bodies formed of glass, said vitreous enamels being applied to the surface of a metallic support of aluminum having a highly reflective surface with said surface being characterized by the fact that it is not subject to oxidation during the vitrification of the enamels and, thus, said highly reflective surface may be maintained thereupon. The highly reflective surface results, as will be made apparent in greater detail hereinbelow, in a light reflecting article incorporating a vitreous enamel coating whose light reflectivity is as much as ten times greater than the light reflectivity of conventional light reflecting articles incorporating light refracting spheroidal bodies in vitreous enamel coatings.

Another object of the invention is the provision of a light reflecting article which includes a sheet metal support formed from aluminum incorporating a minimal amount of oxidizing agents whereby, when a highly reflective surface is created on said sheet metal support, by either chemical or mechanical processes, said reflective surface will be preserved, during the subjection of a vitreous enamel coating upon said surface to vitrifying temperatures, because of the minimal amount of oxidizing agents in said sheet metal support.

A further object of the invention is the provision of a light reflecting article including a sheet metal support or plate having a highly reflective surface thereupon and a coating of a vitrified enamel disposed in overlying relationship with said surface, said coating having incorporated therein a plurality of light refracting spheroidal bodies, the perimeter of each body being juxtaposed to said light reflecting surface at one portion thereof and protruding above said coating at another portion thereof.

A further object of the invention is the provision of a light reflecting article wherein a second coating of vitrified enamel is applied in overlying relationship with a first coating, said second coating incorporating fused metallic oxides adapted to impart a desired color to the first coating.

A further object of the invention is the provision in a light reflecting article of the aforementioned character, of a sheet metal support having a highly reflective surface and a first coating of vitrified enamel having a plurality of light refracting spheroidal bodies distributed therein with a second color coating of vitrified enamel deposited in overlying relationship with said first coating and a third coating of vitrified enamel deposited in overlying relationship with said second coating and configured in the shape of a symbol, such as the conventional arrows utilized in road signs and the like.

It is also contemplated that light refracting spheroidal bodies incorporating coloring material may be utilized in substitution for the colorless bodies conventionally used. A coating of colored vitrified enamel is to be used in conjunction with the sheet metal support and colored spheroidal bodies.

Another object of the invention is the provision of a light reflecting article having a coating of vitrified enamel in overlying relationship with a highly reflective metallic surface and spheroidal light reflecting and refracting bodies distributed throughout said coating, wherein said coating incorporates a colored mill additive to impart color to said coating.

A further object of the invention is the provision of a light reflecting article wherein the highly reflective metallic surface incorporates a plurality of semi-circular depressions disposed in uniformly spaced relationship. When the spheroidal bodies are deposited in the vitreous coating on said surface, they sink downwardly into said depressions and the walls of the depressions provide a much higher reflective-refractive angle than is achieved with the planar highly reflective surface characteristic of certain of the embodiments of the invention.

Other objects and advantages of the invention will be apparent from the following specification and the accompanying drawings, which are for the purpose of illustration only and in which:

FIG. 1 is a highly enlarged fragmentary sectional view of a typical light reflecting article manufactured in accordance with the teachings of the invention;

FIG. 2 is a highly enlarged fragmentary sectional view of another reflecting article of the invention;

FIG. 3 is a view similar to FIG. 1 illustrating the manner in which light rays are reflected from the light reflecting article of FIG. 1;

FIG. 4 is a highly enlarged fragmentary sectional view of an alternative embodiment of a typical light reflecting article manufactured in accordance with the teachings of the invention;

FIG. 5 is a diagrammatic sequence of the steps followed in one method of fabricating a light reflecting article of the invention.

Referring to the drawings, and particularly to FIG. 1 thereof, there is shown a light reflecting article 10 constructed in accordance with the teachings of the invention and including a sheet metal support or backing plate 12 having a highly reflective surface 14 provided thereupon. Disposed in overlying relationship with the highly reflective surface 14 is a coating 16 of vitrified enamel. The coating 16 is approximately .001 inch in depth prior to application of spheroidal bodies 18 thereto, and the vitrified enamel constituting the same is characterized by greater light translucency than has been previously found in such enamels.

Incorporated in the coating 16 is a plurality of spheroidal bodies 18 constituted by beads or spheres of glass and providing lenticular light transmitting and reflecting surfaces which cooperate, in a manner to be described in greater detail below, with the highly polished reflecting surface plate 14. It will be noted that the spheroidal bodies 18 are characterized by the fact that they are approximately .025–.035 inch in diameter but there is a tolerance of plus or minus .001 inch so that, generally speaking, the lower halves of the spheroidal bodies 18 are embedded in the coating 16 of vitreous enamel, which as will be made apparent hereinbelow, constitutes the first coating on the support plate 12 in the embodiment of the invention under consideration. It will be noted that the lower portions of the peripheries of the spheroids or beads 18 are closely juxtaposed to the highly polished reflective surface 14 of the plate 12 in order that the light reflecting characteristics of said surface will impart greater brilliance to the light reflected and refracted through the spheroidal bodies 18 and the translucent vitrified enamel 16.

Prior to the development of the light reflecting article 10 of the invention, the light reflectivity of signs and other devices comprising sheet metal backing plates formed of conventional enameling iron, a coating of vitrified enamel and including spheroidal bodies, has been relatively low. This is due to the fact that, during the vitrification of conventional vitreous enamels at temperatures in the order of 1300°–1600° F., excessive oxidation of the surface of the enameling iron backing plate occurs thus materially reducing the reflective characteristics of said surface. However, it has been found that an aluminum alloy, such as 1100, 3003 and 7072, having a minimum amount of oxidizing components therein, when provided with a highly reflective surface, will maintain said reflective surface if the temperatures to which the vitreous enamel is exposed are maintained in the range of 970°–1030° F.

The above-mentioned aluminum alloys are characterized by the incorporation of a minimal amount of oxidizing agents and, thus, when subjected to temperatures of the order suggested hereinabove, do not oxidize to the excessive extent characteristic of the various steels conventionally utilized as backing plates. While reference is made to the utilization of sheet metal backing or support plates throughout the specification, it should be understood that the utilization of aluminum metallic support members of any gauge or thinness is feasible so long as the methods of the invention disclosed hereinabove are utilized. When relatively thin aluminum sheet is used, it may be supported on a supporting board, or the like. In addition, it is also feasible to use plates constituted by a relatively stiff base having the desired alloy mechanically applied to the surface thereof.

The highly reflective surface 14 may be imparted to the sheet metal backing 12 by any suitable means such as chemical treatment or mechanical polishing, as will be disclosed hereinbelow. It has been found that flash anodizing is a most effective and economical expedient to achieve the desired highly reflective surface.

Anodizing provides a thin oxide coating on the highly polished surface 14 which will receive the coating 16 more effectively, and in the preesnt embodiment of the invention, the spheroids 18 are clear, transparent beads of glass having an index of refraction in the range of .168 to .020. If colored beads are used, the index of refraction will be in the range of .150 to .168.

The first coating 16 of vitrified enamel is a relatively translucent porcelain enamel adapted to be vitrified at temperatures in the range of 970°–1030° F. It has been discovered that an optimum temperature for the vitrification of the vitreous enamel which is applied as the first coating 16 is 1000°.

As is well known to those skilled in the art, an incident beam or ray of light striking the light reflecting article 10 is refracted by the spheroids 19, and reflected by the underlying highly reflective surface 14 of the sheet metal support 12. In this manner, a broad cone of light is selectively returned toward the source. Therefore, road signs, markers and other devices fabricated in accordance with the teachings of the invention are characterized by a reflectivity and refraction of light which is approximately six to ten times as great as that encountered in conventional vitreous enamel light reflecting articles produced by conventional methods.

The transparent spheroids 18 may be made of any suitably hard, clear, transparent solid material, such as quartz or ordinary inorganic glass. Small spheroids 18 are employed to provide thousands of spheroids per square inch of surface of the light reflecting article 10. In the present invention spheroids having an average diameter of 3 mils are utilized, in which case there will be in excess of 10,000 spheroids per square inch to provide a relatively smooth surface upon which symbols of vitreous enamel or other material can be applied.

The depth of the first coating 16 of vitrified enamel is approximately one mil and the materials utilized are characterized by the fact that they are capable of being vitrified in an ambient oxidizing atmosphere at temperatures in the range of 970°–1030° F. Various commercially available porcelain enamel slips are characterized by vitrification at the relatively low temperatures, among them being:

American Lava Company's frit No. 8102
Ferro Corporation's frit Nos. AL–8, AL–2, AL–1
Du Pont's frit No. L 388
O'Hommel Company's frit No. 5588

Specific examples of the utilization of the particular types of frits will be presented hereinbelow.

In any event, after the highly reflective surface 14 of the sheet metal backing plate 12 has been prepared, the selected frit, properly admixed with a mill additive and other components, is sprayed or otherwise applied upon said highly reflective surface in the form of a porcelain enamel slip. Subsequently, while the slip is still fluid and wet, spheroids 18 are uniformly applied to the surface of the vitreous porcelain enamel slip and permitted to gravitate downwardly through the one mil thickness of the slip until the lower peripheries thereof are closely adjacent the highly reflecting surface 14 of the sheet metal support 12. It is most desirable that the distribution of the spheroids 18 be such that a monolayer of spheroids 18 is provided. The spheroids 18 should be located as closely as possible to each other and, since their diameters range generally in the order of three mils, approximately half of the diameter of each spheroid 18 is encompassed in the first coating 16 of vitreous porcelain enamel.

Subsequently, in practicing one method of the invention, the sheet metal backing plate 12 with the vitreous enamel coating 16 and spheroids 18 deposited therein is placed in an oven and subjected to temperatures in the range of 970°–1030° F. for a period of approximately six to thirteen minutes. Due to the temperature at which the porcelain enamel coating 16 is vitrified and to the absence of a substantial amount of oxidants in the sheet metal backing plate 12, the highly reflective surface 14 of said plate is preserved, and thus, the light reflecting characteristics thereof are greatly enhanced.

For instance, where conventional backing plates commonly referred to as "enameling iron" are utilized as sheet metal backing plates in the fabrication of conventional light reflecting articles, the light reflectivity of such light reflecting articles is in the order of 10 candle power. Light reflectivity and refraction characteristics in the order of 40 to 122 candle power are obtained in articles of the present invention, thus providing a light reflecting article which is four to ten times as effective and brilliant as conventional light reflecting articles utilizing conventional materials and methods of fabrication.

In one embodiment of the invention, it is contemplated that the spheroids 18, instead of being fabricated from clear translucent material of the character referred to hereinabove, will be fabricated from material incorporating a permanent coloring agent adapted to impart color reflectivity and refraction to the spheroids 18.

However, where clear, transparent, non-colored spheroids 18 are used, a second color coating 20 may be applied. This color coating 20 is constituted by the same basic frits utilized in the first coating 16. It will be noted that the color coating is also approximately one mil in thickness and that portion of the perimeters of the spheroids 18 project above the surface thereof. The constituent elements of the colored coating 20 will be presented hereinbelow in describing various methods practiced in accordance with the teachings of the invention.

Subsequently to the application of the color coating 20 by spraying or the like, the assembly is once again placed in the oven and heated to temperatures in the range of 970°–1030° F. It has been discovered, however, that, as in the case of the first coating 16 of vitreous enamel, an optimum temperature is 1000° F.

After the vitrification of the second color coating of vitreous porcelain enamel, a suitable overlay in the form of various types of indicia may be applied. This overlay constitutes a third coating of vitreous enamel of the same character of that previously disclosed hereinabove and may be in the form of arrows, letters, or numerals and, after having been applied, as by spraying through a mask or by silk screening, the article is once again placed in an oven and subjected to temperatures for the times mentioned hereinabove.

Shown in FIG. 2 of the drawings is another embodiment 15 of the invention wherein a coating 17 applied over the highly polished surface 14 includes a colored frit to impart a translucent color effect. This eliminates the necessity for the second color coating 20 and greatly simplifies the manufacture of the light reflecting article 15.

In order to illustrate the various methods of fabricating light reflecting articles of the invention, several examples are presented hereinbelow.

EXAMPLE 1

In a preferred method of fabricating the light reflecting article 15, a sheet of 1100 aluminum alloy is prepared by imparting to the surface thereof a highly reflective surface 14. This can be accomplished by mechanical means or by chemical treatment. In chemical treatment, the support sheets are placed in racks and are submerged in a chemical polishing solution for approximately four minutes. The solution consists of phosphoric acid, 73–83%, nitric acid, 2–5%, water, 12–25%, temperature, 180°–190° F. After immersion in the solution, the sheets are rinsed in cold water and are subsequently flash anodized for one minute in a sulphuric acid bath. Subsequently they are rinsed in a hot water bath to remove all traces of sulphuric acid.

However, it has been discovered that a sufficiently highly reflective surface can be attained by the use of flash anodizing alone, and this is the method followed in the present example. After the aforementioned anodic treatment step, the surfaces of the sheet 12 are characterized by a highly reflective surface. Typical analyses of vitreous porcelain enamels which can be utilized in practicing the method of the invention are listed hereinbelow.

Frit 1

Chemical analysis:
Ignition loss 1200° C. _____ 1.46
Silicia, $SiO_2$ _____ 32.03
Iron plus aluminum oxides, $R_2O_3$ _____ 4.01
Barium oxide, BaO _____ 0.00
Calcium oxide, CaO _____ 0.00
Magnesium oxide, MgO _____ 0.28
Potassium oxide, $K_2O$ _____ 6.78
Sodium oxide, $Na_2O$ _____ 20.77
Boric oxide, $B_2O_3$ _____ 4.35
Sulfur trioxide, $SO_3$ _____ 0.04
Antimony as $Sb_2O_3$ _____ 8.08
Titanium oxide, $TiO_2$ _____ 17.85
Lithium oxide, $Li_2O$ _____ 3.90

Total _____ 99.55

THERMAL EXPANSION

Coefficient of thermal expansion 0–300° C.=$146.9 \times 10^{-7}$
Index of refraction=1.632

*Note.*—Index of refraction determined on powdered sample by immersing in oils and examining microscopically. When a match was obtained between oil and glass the index of the oil was measured by a refractometer. The accuracy of the measurement is about 0.002.

Frit 2

Chemical analysis:
Ignition loss 1200° C. _____ 1.69
Silica, $SiO_2$ _____ 33.30
Iron plus aluminum oxides, $R_2O_3$ _____ 4.24
Barium oxide, BaO _____ 0.00
Calcium oxide, CaO _____ 0.00
Magnesium oxide, MgO _____ 0.26
Potassium oxide, $K_2O$ _____ 7.48
Sodium oxide, $Na_2O$ _____ 19.67
Boric oxide, $B_2O_3$ _____ 3.57
Sulfur trioxide, $SO_3$ _____ 0.07
Antimony as $Sb_2O_3$ _____ 7.81
Titanium oxide, $TiO_2$ _____ 18.36
Lithium oxide, $Li_2O$ _____ 3.66

Total _____ 100.11

THERMAL EXPANSION

Coefficient of thermal expansion 0–300° C.=$143.9 \times 10^{-7}$
Index of refraction=1.631

A typical formula for the application of the coating 17 is as follows:

```
                                                    Parts
Frit 2 _____   100
8902 mill additive _____ 20–30
Cerium oxide _____  5–15
Titanium dioxide (RA-10) _____    75
```

Fineness—All through 400 mesh screen
Specific gravity—1.35–1.45

The formula for the 8902 mill additive is as follows:

5.25 parts Brand N sodium silicate, Philadelphia Quartz Company.
2.94 parts Kasil SS Brand potassium silicate, Philadelphia Quartz Company.
1.26 parts sodium hydroxide
1.05 parts boric acid
10.50 parts water The coating 17 is applied in the form of a slurry by means of spraying to the surface 14 of the aluminum plate 12. Subsequently glass beads or spheroids whose diameters fall into a range of .025–.035 inch are applied uniformly to the coating 17 by means of conventional applicators. The cerium oxide and titanium oxide are added as coloring agents and impart to the resultant coating 17 a white appearance which provides for daytime visibility of the light reflecting article 15 in a manner to be described in greater detail below. After the deposition of the spheroids 18, at least half of the upper perimeters of the bodies of said spheroids project above the surface of the coating 17 which is approximately one-half mil in thickness. Subsequently, the article 15 is placed in an oven and subjected to an ambient oxidizing atmosphere in the range of 1000° F. Fluctuations in a range between 970°–1030° F. have been found to be feasible. The extent of time exposure is in the range between six to thirteen minutes depending on the efficiency of the oven in which the article 15 is heated. Another factor involved in heating time is the thickness of the supporting plate 12 which must, of course, be heated to the vitrifying temperature.

After vitrification of the coating 17, the article 15 is removed from the oven and a suitable symbol can be applied to the surface thereof by means of a colored slurry of vitreous porcelain enamels of the same components as the coating 17 with different coloring agents therein. Application may be by means of spraying through a mask or by silk screening. After application of the symbols or indicia, the light reflecting article 15 is once again placed in the oven and heated in the above described manner. As a matter of fact, the symbols may be applied to the wet coating 17 and both fired simultaneously.

Unlike conventional porcelain enamels, the vitreous enamel coating 17 is characterized by vitrification in the temperature ranges set forth hereinabove and it is thought that the substantially non-oxidizing characteristics of the aluminum support 12 and the relatively low heat to which the coating 17 is subjected result in the substantially enhanced maximum reflectivity of the highly polished surface 14 and the associated spheroids 18.

Another formula for the coating 17 which provides an extremely clear coating is as follows:

| | Parts |
|---|---|
| Frit | 100 |
| Du Pont 389 mill additive | 25 |
| Boric acid | 5 |

The Du Pont mill additive consists essentially of an admixture of sodium silicate, potassium silicate, sodium hydroxide and boric acid.

EXAMPLE 2

In another method of fabricating the light reflecting article, 100 parts of Frit 1 are utilized. The mill additive utilized in Example 1 is admixed with Frit 1 with the exception that the coloring agents cerium oxide and titanium dioxide are eliminated. The resulting slurry is applied to the highly reflective anodized aluminum sheet surface 14 and the beads or spheroids 18 deposited thereupon in the above described manner. If desired, the resulting combination can be placed in the aforementioned oven and the coating 16 vitrified at a temperature of 1000° F.

The resultant first coating 16 is quite translucent because of the fact that the elements constituting the same do not impart any coloring thereto. In order to impart the appearance of color to the coating 16, it is necessary to provide a second colored coating 20, as in the embodiment of FIG. 1 of the drawings. After this coating has been applied in overlying relationship with the first coating 16, the article is once again placed in the oven to vitrify the colored coating 20.

Prior to the vitrification of the colored coating 20, it may be desirable to brush the coating 20 if it has covered the beads 18. It is also possible to apply the second color coating 20 in overlying relationship with the first coating 16 and to simultaneously vitrify the same. This eliminates the necessity for the two heating steps entailed by the successive vitrification of the coatings 16 and 20.

EXAMPLE 3

Example 3 involves the proposed steps of Example 2 with the exception that the beads or spheroids 18 incorporate a coloring agent to impart a colored appearance to the resulting light reflecting article. In such a case, the second coating 20 need not be applied since reliance can be had upon the colored beads or spheroids 18 to impart the necessary appearance of color refraction.

Light reflecting articles having a reflectivity of as high as 122 units of candle power per foot candle per square foot have been fabricated by utilizing the teachings of the invention, the candle power being measured at an angle of ⅓° divergence with a distance of fifty feet between the test article and the light source.

Another embodiment 30 of the light reflecting article of the invention is shown in FIG. 4 of the drawings as including a backing plate 32 which provides a highly reflective surface 34 incorporating a plurality of uniformly spaced concavities 36. The concavities 36 may be formed in the highly reflective surface 34 by various methods such as the utilization of embossing rolls, or the like. However, at the present time, the concavities 36 are formed in immediate juxtaposition to one another by shot peening or grid blasting.

As in the case of the previously discussed embodiments of the invention, a relatively thin ½ mil coating 38 of vitreous enamel is applied to the highly reflective surface 34. Of course, the coating 38 extends across the concavities 36 which are approximately ½ to 1 mil in depth, or in proportion to the size of the reflective bead used.

Subsequently to the deposition of vitreous enamel coating 38 upon the highly reflective surface 34, a plurality of glass spheroids or beads 42 is uniformly disposed on said highly reflective surface. As will be noted from FIG. 4 of the drawings, the glass beads 42 are located in nesting relationship with the concavities 36 and thus are immediately juxtaposed to the portions of the reflecting surface 34 constituted by said concavities. In this manner, the reflective-refractive angle is greatly increased over the light reflecting articles wherein the spheroids are immediately juxtaposed to a planar surface.

We claim:

1. In a light reflecting article, the combination of: an aluminum sheet having an anodized highly reflective metal surface; a coating of vitrified enamel applied directly to said anodized metal surface, said enamel coating having high light translucency, said sheet being free of coatings between said enamel coating and said anodized metal surface; a plurality of light transmitting, transparent, refractive, spheroidal bodies embedded in and extending through virtually the entire thickness of said enamel coating so as to position portions of said bodies closely adjacent said anodized metal surface, other portions of said spheroidal bodies extending above said enamel coating, said enamel coating binding said spheroidal bodies closely adjacent said sheet anodized metal surface.

2. In a light reflecting article, the combination of: an aluminum sheet having an anodized highly reflective metal surface; a coating of vitrified enamel applied directly to said anodized metal surface, said enamel coating having high light translucency, said enamel coating having coloring means therein for producing a translucent color effect from light reflecting through said enamel coating, said sheet being free of coatings between said enamel coating and said sheet anodized metal surface; a plurality of light transmitting, transparent, refractive, spheroidal bodies embedded in and extending through virtually the entire thickness of said enamel coating so as to position portions of said bodies closely adjacent said sheet anodized metal surface, other portions of said spheroidal bodies extending above said enamel coating, said enamel coating binding said spheroidal bodies closely adjacent said sheet anodized metal surface.

3. In a light reflecting article, the combination of: an aluminum sheet having an anodized highly reflective metal surface; a first coating of vitrified enamel applied directly to said sheet anodized metal surface, said first enamel coating having high light translucency, said first enamel coating being colorless, said sheet being free of coatings between said first enamel coating and said sheet anodized metal surface; a plurality of light transmitting, transparent, refractive, spheroidal bodies embedded in and extending through virtually the entire thickness of said first enamel coating so as to position portions of said bodies closely adjacent said sheet anodized metal surface, other portions of said spheroidal bodies extending above said first enamel coating, said first enamel coating binding said spheroidal bodies closely adjacent said sheet anodized metal surface; and a second coating of vitrified enamel applied directly over said first enamel coating, said second enamel coating having high light translucency, said second enamel coating having coloring means therein for producing a translucent color effect from light reflecting through said first and second enamel coatings, said second enamel coating encompassing parts of said spheroidal body other portions with parts of said other portions extending above said second enamel coating.

References Cited by the Examiner

UNITED STATES PATENTS

| | | | |
|---|---|---|---|
| 912,171 | 2/1909 | Rock. | |
| 1,001,013 | 8/1911 | Franz. | |
| 2,149,171 | 2/1939 | Grote | 88—82 |
| 2,218,909 | 10/1940 | Gill | 117—21 |
| 2,326,634 | 8/1943 | Gebhard et al. | 88—82 |
| 2,379,702 | 7/1945 | Gebhard | 88—82 |
| 2,379,741 | 7/1945 | Palmquist | 88—82 |
| 2,383,884 | 8/1945 | Palmquist | 88—82 |
| 2,407,680 | 9/1946 | Palmquist et al. | 88—82 |
| 2,432,928 | 12/1947 | Palmquist | 88—82 X |
| 2,555,715 | 6/1951 | Tatum | 88—105 X |
| 2,568,126 | 9/1951 | Keeley | 88—82 X |
| 2,592,882 | 4/1952 | Fisher et al. | 88—82 |
| 2,713,286 | 7/1955 | Taylor | 88—82 |
| 2,952,192 | 9/1960 | Nagin | 94—1.5 |
| 3,043,196 | 7/1962 | Palmquist et al. | 88—82 |
| 3,164,494 | 1/1965 | English | 161—225 X |
| 3,171,771 | 3/1965 | Badger et al. | 161—193 X |

JEWELL H. PEDERSEN, *Primary Examiner.*

D. J. HOFFMANN, T. L. HUDSON,
*Assistant Examiners.*

UNITED STATES PATENT OFFICE
CERTIFICATE OF CORRECTION

Patent No. 3,279,316 October 18, 1966

Hugh V. Penton et al.

It is hereby certified that error appears in the above numbered patent requiring correction and that the said Letters Patent should read as corrected below.

Column 1, line 31, for ".025 to .035" read -- .0025 to .0035 --; column 3, line 20 and column 6, line 74, for ".025-.035", each occurrence, read -- .0025-.0035 --; column 3, line 75, for ".168" read -- 1.68 --; column 4, line 1, for ".020" read -- 2.0 --; line 2, for ".150" read -- 1.50 --; same line 2, for ".168" read -- 1.68 --.

Signed and sealed this 5th day of September 1967.

(SEAL)
Attest:

ERNEST W. SWIDER
Attesting Officer

EDWARD J. BRENNER
Commissioner of Patents